(12) United States Patent
Taylor et al.

(10) Patent No.: US 7,628,916 B2
(45) Date of Patent: Dec. 8, 2009

(54) HOLLOW FIBER MODULE

(75) Inventors: Gareth P. Taylor, Indian Trail, NC (US); Robert H. Carroll, Lancaster, SC (US); Tony R. Vido, Belmont, NC (US); Timothy D. Price, Monroe, NC (US)

(73) Assignee: Celgard LLC, Charlotte, NC (US)

( * ) Notice: Subject to any disclaimer, the term of this patent is extended or adjusted under 35 U.S.C. 154(b) by 929 days.

(21) Appl. No.: 11/043,351

(22) Filed: Jan. 26, 2005

(65) Prior Publication Data
US 2006/0163140 A1 Jul. 27, 2006

(51) Int. Cl.
*B01D 63/04* (2006.01)
*B01D 63/02* (2006.01)
*B01D 69/08* (2006.01)
*B01D 61/00* (2006.01)

(52) U.S. Cl. ............... 210/321.79; 210/321.6; 210/321.88; 210/650; 210/652; 210/321.9; 96/4; 96/10

(58) Field of Classification Search ............ None
See application file for complete search history.

(56) References Cited

U.S. PATENT DOCUMENTS

| | | | | |
|---|---|---|---|---|
| 4,959,152 A | * | 9/1990 | Nichols | 210/651 |
| 5,164,081 A | | 11/1992 | Nichols et al. | |
| 5,174,900 A | | 12/1992 | Nichols et al. | |
| 5,366,625 A | | 11/1994 | Pedersen et al. | |

FOREIGN PATENT DOCUMENTS

| | | |
|---|---|---|
| EP | 0350853 A1 | 1/1990 |
| EP | 0521495 A2 | 1/1993 |
| FR | 2222134 | 10/1974 |

* cited by examiner

*Primary Examiner*—Krishnan S Menon
(74) *Attorney, Agent, or Firm*—Hammer & Associates, P.C.

(57) ABSTRACT

A hollow fiber cartridge includes a stack of hollow fiber mats. The stack has a major axis and two end faces. Each mat is substantially perpendicular to the axis. An end cap is united to each end face.

27 Claims, 3 Drawing Sheets

HOLLOW FIBER MODULE

FIELD OF THE INVENTION

The invention is a hollow fiber module and its method of manufacture.

BACKGROUND OF THE INVENTION

Hollow fiber membrane modules where the hollow fibers membranes are substantially perpendicular to the major axis of the module are known. Hollow fiber membrane modules of this type are illustrated in French Patent 2,222,134; European Patent Application Publications 350,853 and 521,495; and U.S. Pat. No. 5,164,081, each is incorporated herein by reference. In each of these, hollow fiber mats are embedded in an annular ring of potting material. These embedded mats are then inserted into a housing to form the module. The difficulty with these prior art modules is that they are costly to make because they require the use of a casting mold that must be broken-away from the formed embedded mats. The mold breakaway step is labor intensive and time consuming.

Accordingly, there is a need for a more cost-effective module and a method of making same.

SUMMARY OF THE INVENTION

A hollow fiber cartridge includes a stack of hollow fiber mats. The stack has a major axis and two end faces. Each mat is substantially perpendicular to the axis. An end cap is united to each end face.

Alternatively, a hollow fiber cartridge includes a hollow fiber mat having a peripheral edge portion. A stack of the mats is laid up. The peripheral edge portion of each mat is aligned with the edge portion of the adjacent mat. The stack has a major axis and two end faces. Each mat is substantially perpendicular to the axis. An end cap is united to each end face. Potting material defines a wall at the peripheral edge portions of the stacked mats and bonds the end caps to the stack.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
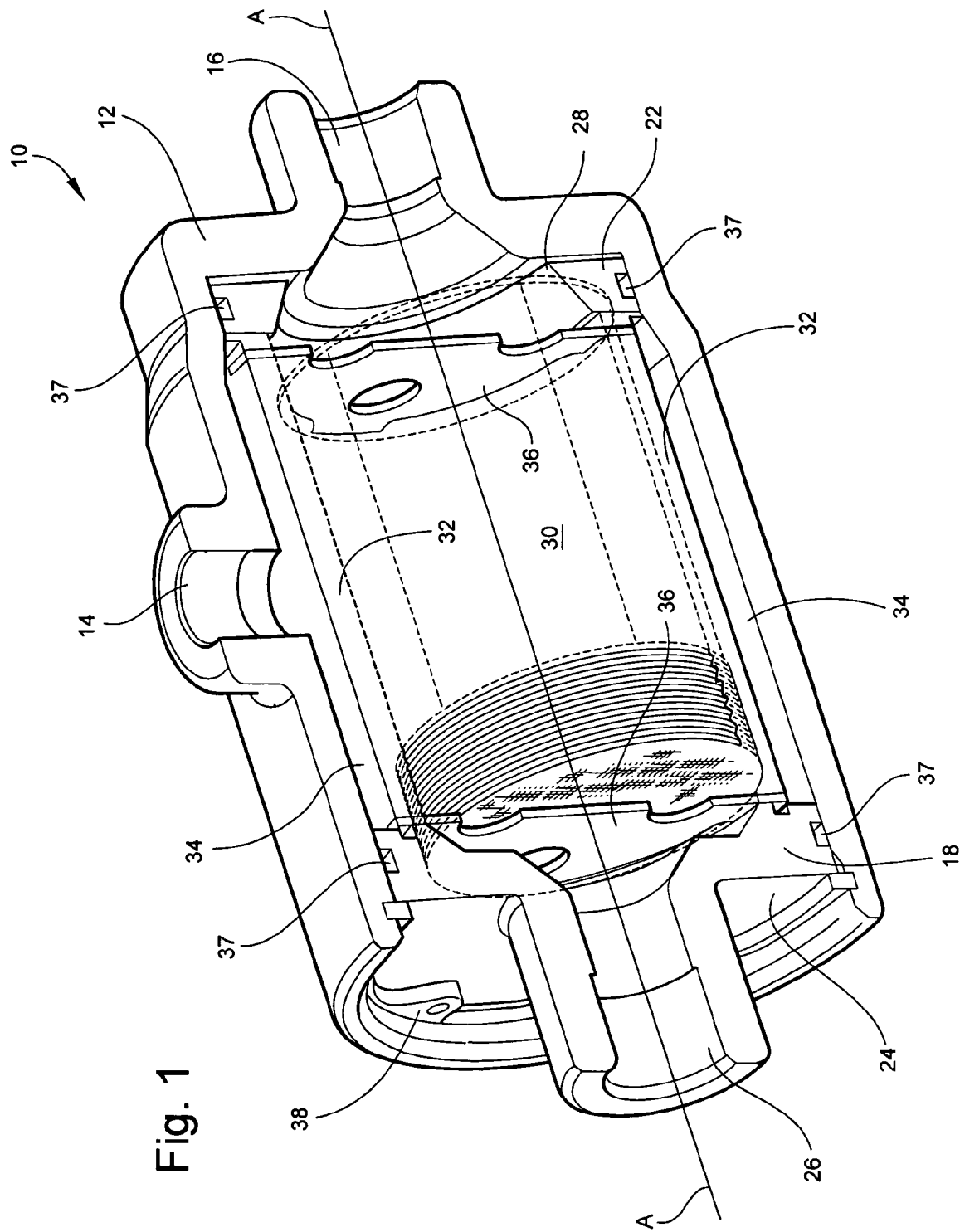
FIG. 1 illustrates the assembled hollow fiber module.

Referring to the drawings wherein like numerals indicate like elements, there is shown in FIG. 1 a hollow fiber module 10 having a major axis A.

Module 10 comprises a housing 12 and a cartridge 18. Cartridge 18 may be held in housing 12 by any suitable means. For example, in FIG. 1, cartridge 18 is held in place by a retaining clip 38. Other means, not shown, include gluing, welding, spin welding, threading, and the like. These means may permanently hold the cartridge 18 in housing 12 or may allow the cartridge 18 to be removed from the housing 12. These means should insure that housing 12 and cartridge 18 are maintained in fluid-tight engagement.

Housing 12 is a generally cup-shaped housing and preferably has a radial port 14 and an axial port 16. Housing 12 is sized to receive cartridge 18. Housing 12 may be made of any material, metal, plastic, or composite. Housing 12 is preferably a molded piece. Preferably, ports 14 and 16 may be equipped with coupling mechanisms for connection to a system, e.g., threading (internal/external), etc.

Cartridge 18 is adapted for insertion into housing 12. Cartridge 18 comprises a distal end cap 22 having an axial port 28, a proximal end cap 24 having an axial port 26, a stack 30 of hollow fiber mats sandwiched between caps 22 and 24, and a wall 32 defining a peripheral edge portion of the mats, being united with end caps 22 and 24, and being continuous or integral between end caps 22 and 24. Optionally, the stack 30 of mats may include one or more baffles 36. Preferably, port 26 may be equipped with a coupling mechanism for connection to a system, e.g., threading (internal/external), etc.

When assembled, the module 10 includes a headspace 34. Headspace 34 is defined by wall 32 of the cartridge 18 and the internal lateral wall of the housing 12. Headspace 34 is in communication with axial port 14 and the open ends of the hollow fibers of the mats at the exterior surface of wall 32. Additionally, the end caps 22 and 24 are sealed fluid-tight to the internal wall of the housing 12. In FIG. 1, this seal is illustrated by the use of "O"-rings 37, but this seal is not so limited and other sealing means may be used. Such sealing means include gluing, welding, spin welding, threading, and the like.

In operation, module 10 may be used as a membrane contactor or membrane filter or heat exchanger. For example, a fluid is introduced into module 10 via axial port 16 and exits via axial port 26 (or vice versa). As the fluid travels over the external surfaces of the hollow fibers fluids may be removed or added (membrane contactor), unwanted materials may be blocked (filtration), or energy (e.g., heating or cooling) may be added or removed (heat exchange). Depending upon the use of the module, the characteristics of the hollow fiber will change.

In the membrane contactor mode, the removed fluid passes through the wall of the hollow fiber, into the lumen, and out through radial port 14 by way of headspace 34. Removal of the fluid may be facilitated by application of vacuum or partial vacuum, and/or sweep gas (if another port is added to housing 12 and headspace 34 is partitioned). Alternatively, fluids (e.g., gases, such as carbon dioxide, nitrogen, oxygen, etc.) may be introduced into the fluid. The added fluid is introduced through radial port 14 to headspace 34 to the hollow fiber lumens and out through the wall of the hollow fiber into the fluid.

In the filtration mode, contaminated fluid is introduced via port 26 and exits via port 16 (or vice versa). The walls of the hollow fibers block contaminants. Blockage may be facilitated by drawing a vacuum (or partial vacuum) on the lumen side of the hollow fibers.

In the heat exchanger mode, heating or cooling may be accomplished as follows. First, a second port is added to housing 12 and the headspace 34 is partitioned. A first fluid is introduced via port 26 and exits via port 16 (or vice versa). A second fluid is introduced into the partitioned headspace 34 via port 14, travels through the hollow fiber lumens and exits via the partitioned headspace via the second housing port.

Figure 2:
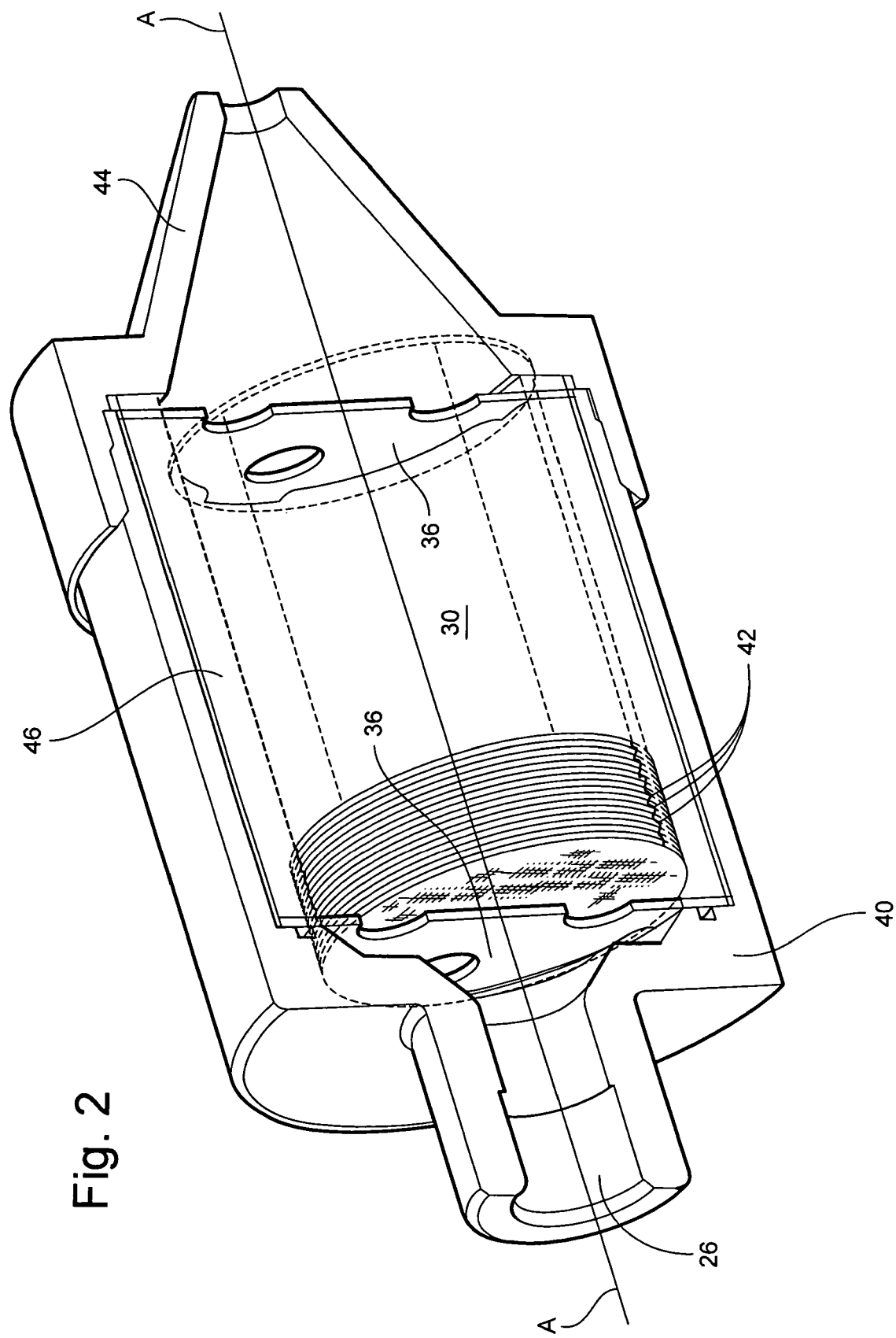
FIG. 2 illustrates the hollow fiber cartridge prior to removing the cup wall.

The module 10 is manufactured as follows:

Referring to FIG. 2, a cup-shaped cartridge housing 40 is filled with a stack 30 of hollow fiber mats 42 and closed with a cap 44. Mats 42 are dimensioned to fill the cavity of housing 40 and are stacked so that they are substantially perpendicular to major axis A. Housing 40 and cap 44 may be made of any material. Such materials include polyolefins, polyvinyl chloride, ABS, Noryl®, PVDF, PFA, or other fluorinated plastics, fiber-reinforced plastics, polysulfones, polycarbonates, polyamides, metals, etc.

Hollow fibers are fibers having a lumen and a wall surrounding the lumen. Hollow fibers may have solid walls, porous walls, or microporous walls (e.g., symmetric pores, asymmetric pores, skinned membranes and the like). These hollow fibers may be made of any material. Such materials include polyolefins (e.g., polyethylene, polypropylene, polybutene, poly methyl pentene), polysulfones (e.g., polysulfone, polyethersulfone, polyarylsulfone), cellulose and its derivations, PVDF, poly phenyl oxide (PPO), PFAA, PTFE, other fluorinated polymers, polyamides, polyether imides (PEI), polyimides, ion-exchange membranes (e.g, Nafion®), etc.

The hollow fiber mats may be woven, knitted, or otherwise joined together in generally planar structures containing a plurality of joined together hollow fibers. The hollow fibers of the mats may be of like materials and properties, or may be of various materials and/or properties. These mats may be cut from a larger fabric to the desired size and shape. Each mat has a peripheral edge portion. When cut, the ends of the fibers are preferably closed (i.e., pinched shut), so that in later steps potting material does not wick into the lumens. Cutting may be accomplished by die cutting ultrasonic cutting, knife cutting (e.g., hot), etc.

When the mats are stacked into the cavity of cartridge housing 40, the peripheral edge portions of the mats are aligned.

A cap 44 is placed over the open end of the cartridge housing 40. The cap 44 is joined to housing 40. This joining may be accomplished by any means, for example gluing, welding, or threading. It is important that cap 44 be joined along its contact surface with the housing 40. Cap 44 preferably includes a generally truncated open-ended cone. The housing 40 and cap 44 hold the stack 30 of mats in place during the next operation of the manufacture process.

The housing 40 and cap 44 are mounted via axial port 26 onto a device that can spin this structure about major axis A. During spinning, a fluid potting material is introduced into the open end of the cone of the cap 44. The potting material, by action of centrifugal force, runs to the interior wall of the housing 40 and thereby forms wall perform 46. Spinning is preferably stopped when the potting material has had sufficient time to solidify to a point that it will no longer run or substantially runs (i.e., retains or substantially retains the shape of the wall perform 46).

Potting material may be any material, for example, thermosetting or thermoplastic materials. These materials are chosen with the following exemplary considerations: bond strength to the hollow fiber, cartridge housing 40 and cap 42, mechanical strength, and chemical resistance. Exemplary potting materials include, but are not limited to, epoxy and polyolefins.

The foregoing spinning step may be further illustrated as follows, it being understood that the invention is not so limited: The cartridge may be spun horizontally. Spinning speeds may be 300-4000 rpm (depending upon, for example, potting viscosity). If cure is performed at ambient temperatures, spinning till substantially no flow could take up to 24 hours; but, if cure is at higher temperatures, then cure times may be shortened, for example at 50° C., spinning time could be dropped to 2 hours, and at 65° C., spinning time to 0.5-0.75 hours. To reach final cure and reduce time on the spinning device, cartridges that are substantially cured may be place in or on heating device. The heating device may be an oven or a heated rolling device. The heated rolling device is preferably a 'hot dog' cooker (i.e., a device that slowly spins the cartridge on heated rollers). The temperature of this device should be as high as possible, but not so high as to damage the hollow fibers or the cartridge.

Figure 3:
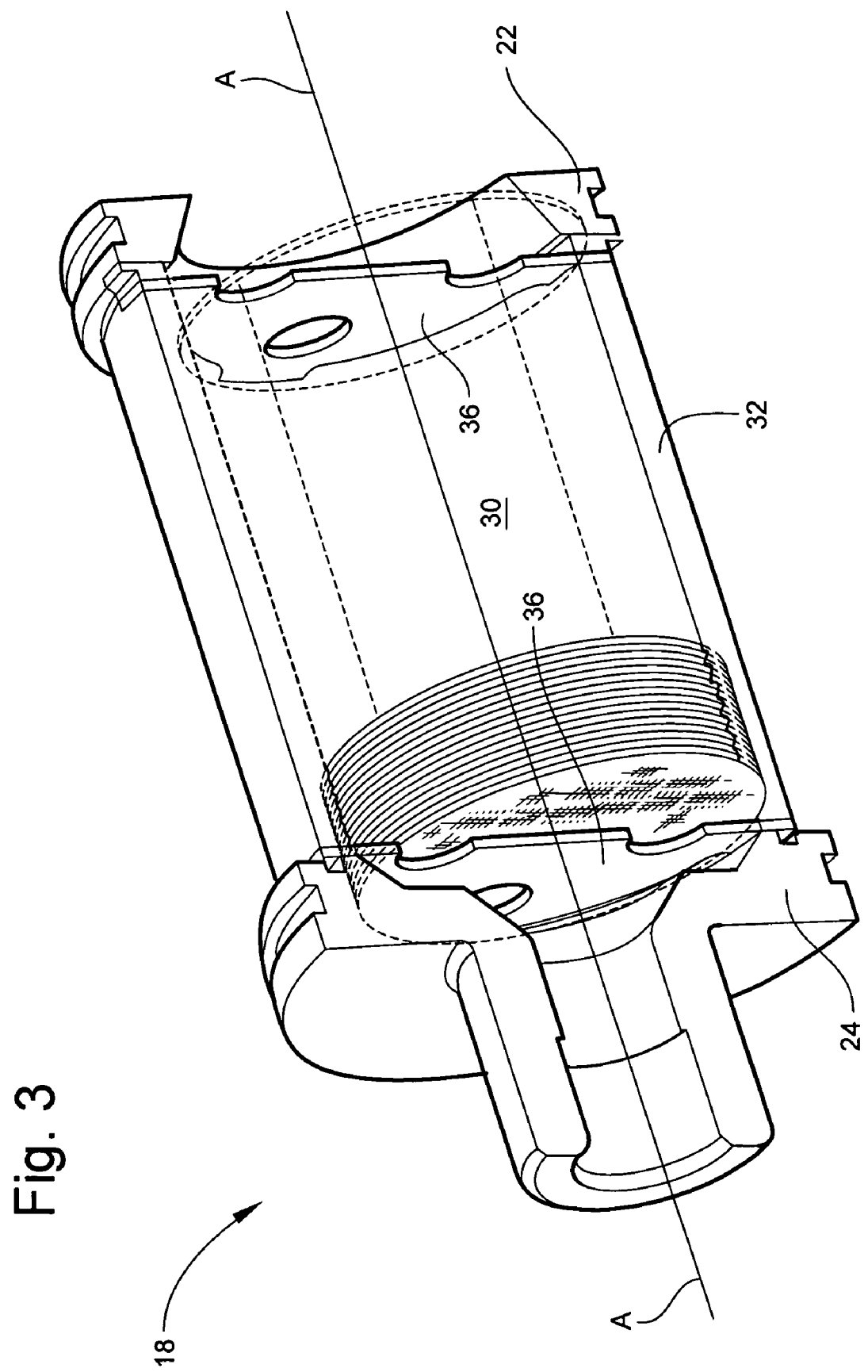
FIG. 3 illustrates the hollow fiber cartridge after removal of the cup wall.

After the potting material has set, excess material is cut away. Referring to FIG. 3, the post-machined cartridge is illustrated. Note that part of housing 40 is now proximal end cap 24, part of cap 42 is now distal end cap 22, and that wall 32 unites end caps 22 and 24. Moreover, wall preform 46 has been cut to form wall 32 and by so doing the ends of the hollow fibers are opened for communication with headspace 34. Care should be taken when cutting wall preform 46, so that hollow fibers are not closed. It is suggested that when a lathe is used that the cutting blade not be located at the midline of the cartridge, but instead that it be located above or below the midline.

After the cartridge 18 is machined to final form, it is inserted into housing perform 46. Referring to FIG. 1, cartridge 18 is shown in place within housing 12. Headspace 34 is defined between wall 32 and the interior surface of the housing 12. End caps 22 and 24 are in fluid tight engagement with the interior wall of housing 12. This fluid tight engagement may be accomplished by any means. For example, this engagement may be accomplished by use of O-rings, glue, welding, spin welding, ultrasonic welding, threading, and the like.

The present invention may be embodied in other forms without departing from the spirit and the essential attributes thereof, and, accordingly, reference should be made to the appended claims, rather than to the foregoing specification, as indicated the scope of the invention.

We claim:

1. A hollow fiber cartridge comprises:
 a stack of hollow fiber mats, each mat having a peripheral edge portion, said stack having a major axis and two end faces, each said mat being substantially perpendicular to said axis;
 at least one end cap being united to one said end face; and
 a potting material defining a wall at said peripheral edge portions of said mats and bonding said end caps to said stack.

2. The hollow fiber cartridge of claim 1 further comprising: an end cap being united to each end face.

3. The hollow fiber cartridge of claim 1 wherein a wall of potting material unites the hollow fiber mats to said end cap.

4. The hollow fiber cartridge of claim 1 wherein said potting material being a thermoset material or a thermoplastic material.

5. The hollow fiber cartridge of claim 1 wherein the hollow fibers of said mat having solid walls, porous walls, or microporous walls.

6. A hollow fiber module comprising a housing containing said cartridge of claim 1.

7. A hollow fiber cartridge comprises:
 a hollow fiber mat having a peripheral edge portion;
 a stack of said mats wherein said peripheral edge portion of each said mat being aligned with said edge portion of said adjacent mat, said stack having a major axis and two end faces, each said mat being substantially perpendicular to said axis;
 at least one end cap united to one said end face; and
 a potting material defining a wall at said peripheral edge portions of said mats and bonding said end caps to said stack.

8. The hollow fiber cartridge of claim 7 further comprising: an end cap being united to each end face.

9. The hollow fiber cartridge of claim 7 wherein the stack of hollow fibers further comprising a baffle.

10. A hollow fiber module comprising a housing containing the cartridge of claim 7.

11. The hollow fiber module of claim 10 further comprising a headspace between said cartridge and said housing and said headspace being partitioned.

12. A method of making a hollow fiber cartridge comprising the steps of:
    filling a cartridge housing having a major axis with a stack of hollow fiber mats, the mats being substantially perpendicular to the axis and each mat having a peripheral edge portion;
    closing the housing with a cap;
    potting the peripheral edge portions of the stacked mats and forming a wall along an interior surface of the housing joining a lower portion of the to the cap; and
    removing a side wall portion of the housing and exposing a lumen of the hollow fiber.

13. A method of making a hollow fiber module comprising the steps of:
    inserting the hollow fiber cartridge of claim 12 into a housing.

14. The method according to claim 12 wherein the hollow fibers having a solid wall, porous wall, or a microporous wall.

15. The method of claim 12 wherein the cap having a shape of a truncated cone.

16. The method of claim 12 wherein the potting material being a thermoset material or a thermoplastic material.

17. The method of claim 12 further comprising curing the potting material.

18. The method of claim 17 wherein curing further comprising heating the cartridge.

19. The method of claim 17 wherein curing comprising heating the cartridge on a hot dog cooker.

20. The method of claim 13 wherein the cartridge being sealed into the housing.

21. The hollow fiber module of claim 6 wherein said housing being a cup-shaped housing adapted to receive said cartridge including:
    a radial port;
    an axial port; and
    a truncated bottom adjacent to said axial port.

22. The hollow fiber module of claim 21 further including a headspace;
    said headspace being defined by said wall at said peripheral edge portions of said mats and the internal lateral wall of said housing; and
    said headspace being in communication with said axial port and the open ends of said hollow fibers of the mats at the exterior surface of said wall.

23. The hollow fiber module of claim 6 wherein said cartridge being held in place in said housing by a retaining clip.

24. The hollow fiber module of claim 6 wherein said cartridge including two end caps, one end cap being united to one of said end faces, and the other end cap being united to the other of said end faces, and wherein each of said end caps being sealed fluidtight to the internal wall of said housing.

25. The hollow fiber cartridge of claim 1 wherein said cartridge including:
    two end caps, one end cap being united to one of said end faces, and the other end cap being united to the other of said end faces;
    said cartridge being adapted to be inserted into a cup-shaped housing including:
        a radial port;
        an axial port; and
        a truncated bottom adjacent to said axial port;
    with each of said end caps being sealed fluid-tight to the internal wall of said housing;
    whereby, said cartridge and said housing creating a headspace defined by said wall at said peripheral edge portions of said mats and the internal lateral wall of said housing;
    said headspace being in communication with said axial port and the open ends of said hollow fibers of the mats at the exterior surface of said wall; and
    said cartridge being held in place in said housing by a retaining clip.

26. The hollow fiber cartridge of claim 7 wherein said cartridge including:
    two end caps, one end cap being united to one of said end faces, and the other end cap being united to the other of said end faces;
    said cartridge being adapted to be inserted into a cup-shaped housing including:
        a radial port;
        an axial port; and
        a truncated bottom adjacent to said axial port;
    with each of said end caps being sealed fluid-tight to the internal wall of said housing;
    whereby, said cartridge and said housing creating a headspace defined by said wall at said peripheral edge portions of said mats and the internal lateral wall of said housing;
    said headspace being in communication with said axial port and the open ends of said hollow fibers of the mats at the exterior surface of said wall; and
    said cartridge being held in place in said housing by a retaining clip.

27. The method of making a hollow fiber module of claim 13 wherein said housing being a cup-shaped housing adapted to receive said cartridge including:
    a radial port;
    an axial port;
    a truncated bottom adjacent to said axial port;
    said module further including a headspace;
    said headspace being defined by said wall at said peripheral edge portions of said mats and the internal lateral wall of said housing;
    said headspace being in communication with said axial port and the open ends of said hollow fibers of the mats at the exterior surface of said wall;
    said cartridge being held in place in said housing by a retaining clip; and
    wherein said cartridge including two end caps, one end cap being united to one of said end faces, and the other end cap being united to the other of said end faces, where each of said end caps being sealed fluid-tight to the internal wall of said housing.

* * * * *